United States Patent

Roark et al.

[11] Patent Number: 5,331,518
[45] Date of Patent: Jul. 19, 1994

[54] VISOR MIRROR COVER ASSEMBLY

[75] Inventors: Jeffrey O. Roark, Allegan; Peter V. Styke, Holland; Robert L. Mattingly, Holland; Drew G. Jelgerhuis, Holland, all of Mich.

[73] Assignee: Prince Corporation, Holland, Mich.

[21] Appl. No.: 949,571

[22] Filed: Sep. 22, 1992

[51] Int. Cl.$^5$ .................................................. B60Q 3/00
[52] U.S. Cl. ........................................ 362/61; 362/144
[58] Field of Search ................... 362/61, 74, 135, 137, 362/140, 144; 296/97.2, 97.5

[56] References Cited

U.S. PATENT DOCUMENTS

| | | |
|---|---|---|
| 1,958,934 | 5/1934 | Williams . |
| 3,653,092 | 4/1972 | Shriner . |
| 4,174,864 | 11/1979 | Viertel et al. . |
| 4,203,149 | 5/1980 | Viertel et al. . |
| 4,213,169 | 7/1980 | Kempkers . |
| 4,227,241 | 10/1980 | Marcus . |
| 4,479,172 | 10/1984 | Connor . |
| 4,491,899 | 1/1985 | Fleming . |
| 4,715,644 | 12/1987 | Lobanoff et al. . |
| 4,760,503 | 1/1991 | VandenBerge et al. . |
| 4,847,737 | 7/1989 | VanOrder et al. ................... 362/137 |
| 4,981,348 | 1/1991 | Prillard . |
| 4,997,228 | 3/1991 | Kempkers ........................... 362/137 |
| 5,059,016 | 10/1991 | Lawassani et al. . |
| 5,098,150 | 3/1992 | Smith et al. . |
| 5,117,337 | 5/1992 | Sakuma ............................... 362/137 |
| 5,205,639 | 4/1993 | White et al. ........................ 362/137 |

OTHER PUBLICATIONS

Applicant's Exhibit A, no date.

Primary Examiner—Richard R. Cole
Attorney, Agent, or Firm—Price, Heneveld, Cooper, DeWitt & Litton

[57] ABSTRACT

A covered vehicle accessory such as a vanity mirror visor includes a socket for receiving at least one pivot axle of the cover. In a preferred embodiment of the invention, a generally C-shaped spring compressibly engages a mirror frame on one side and a cam extending from the cover on a side opposite the front of the frame. The C-shaped spring includes first and second legs which respectively engage the frame and cover. The spring is locked in place in part by a tab formed in the frame and an aperture formed in the spring for receiving the tab and mating inclined walls of the frame and leg segment of the spring. In a preferred embodiment of the invention, also, the cover includes at least one pivot axle having an extension with an electrical contact which engages an electrical contact associated with the frame to define a switch which allows the application of operating power to a lamp associated with the illuminated vanity mirror structure upon opening of the cover.

33 Claims, 4 Drawing Sheets

VISOR MIRROR COVER ASSEMBLY

BACKGROUND OF THE INVENTION

The present invention relates to the mounting of a cover to a vehicle accessory such as an illuminated vanity mirror visor.

Vanity mirrors in vehicle visors are typically covered by a decorative and protective cover such that when the visor is in a lowered use position for sun blocking, the vanity mirror is covered when the mirror is not in use for safety reasons. The cover can be pivoted to a snapped-open position, typically activating lights for illumination of the vanity mirror for use. The cover, therefore, provides not only a safety function, but also a decorative function preventing reflections from the vanity mirror when not in use from distracting the vehicle operator. U.S. Pat. No. 5,098,150 issued on Mar. 24, 1992, discloses an illuminated vanity mirror visor of this type.

Covers for vanity mirrors and other vehicle accessories typically have been molded as a single polymeric member. They usually include some form of bias means such that the cover will conveniently move to a snapped-open or snapped-closed position for ease of operation. There is a variety of manners by which this has been achieved in the past, including providing a cam directly on the pivot sockets for the visor cover as taught, for example, in U.S. Pat. No. 4,213,169, issued in July, 1980. Separate springs anchored to a vanity mirror frame and engaging a cam member on the visor hinge have been used for many years by Daimler-Benz in commercially-available visors as well. U.S. Pat. No. 5,098,150 also teaches the use of a spring clip which extends between a visor core and a visor cover to provide snapped-open and closed visor cover operation as does U.S. Pat. No. 5,078,445, issued Jan. 7, 1992. A difficulty with some of the prior art spring-type cover controls is that they require the springs to be either integrally molded within the mirror frame or require a special and somewhat complicated mounting structure for the frame and/or the cover for holding the spring in place when subjected to the various forces encountered in use. Accordingly, it is desirable to provide a spring-biased, snapped-open and snapped-closed cover for vehicle accessories such as a vanity mirror visor in which the cover and supporting frame are readily manufactured and assembled with the spring being easily added to the combination of the cover and frame and providing the desired control for the cover.

SUMMARY OF THE PRESENT INVENTION

The cover assembly of the present invention accomplishes these goals by providing a cover and frame for the cover which are pivotally mounted with respect to one another and which include means for receiving a bias spring which not only clamps the cover and frame together, but interacts with camming means on the cover for snapped-open and snapped-closed operation of the cover. In a preferred embodiment of the present invention, the cover frame is a mirror frame for a vanity mirror visor and includes socket means for receiving at least one pivot axle of the cover. In a preferred embodiment of the invention, generally C-shaped spring means compressibly engage the frame on one side and cam means extending from the cover on a side opposite the front of the frame. The C-shaped spring means includes first and second legs which respectively engage the frame and cover. Means are provided for locking the spring in place. In a preferred embodiment of the invention, also, the cover includes at least one pivot axle having an extension with electrical contact means formed thereon which engages an electrical contact associated with the frame to define a switch which allows the application of operating power to lamp means associated with the illuminated vanity mirror structure upon opening of the cover.

The resultant structure provides a relatively inexpensive vanity mirror cover having ease of assembly and a minimum number of parts and employing relatively small but sturdy C-shaped springs for providing snapped-open and snapped-closed operation of the cover. These and other features, objects and advantages of the invention will become apparent upon reading the following description thereof together with reference to the accompanying drawings in which:

DETAILED DESCRIPTION OF THE PREFERRED EMBODIMENT

Figure 1:
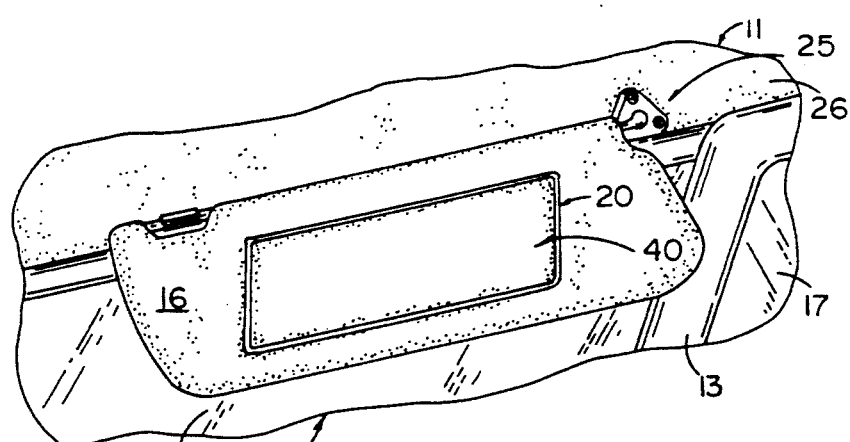
FIG. 1 is a fragmentary, perspective view of a vehicle including a covered vanity mirror visor embodying the present invention.
Figure 2:
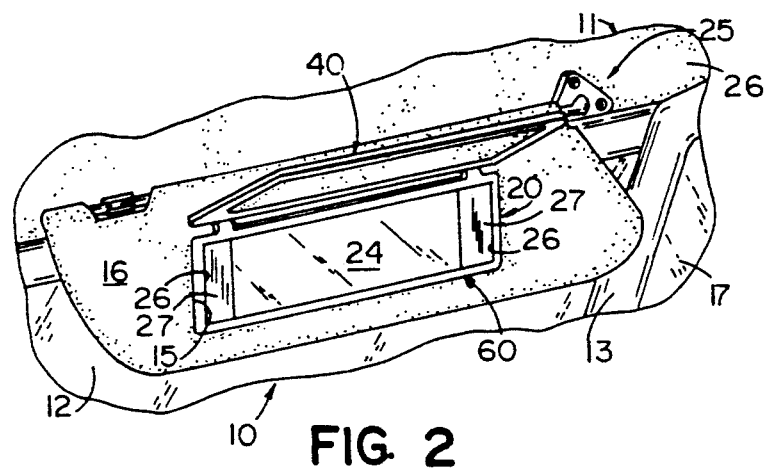
FIG. 2 is a perspective view of the visor shown in FIG. 1 showing the cover in an open position.

Referring initially to FIGS. 1 and 2, there is shown a vehicle accessory such as a visor 10 embodying the present invention and installed in a vehicle such as an automobile 11 with the installation shown being the right front passenger area adjacent windshield 12 and the "A" pillar 13. Visor 10 includes a pivot mounting assembly 25 for mounting the visor to the roof 26 of the vehicle for movement between a lowered, use position illustrated and a raised, stored position adjacent the roof. Conventionally, the mounting assembly allows the visor to pivot from the windshield position shown to a position adjacent the side window 17. The visor includes a central core 30 (FIG. 3) which can be a folded planar material made of polypropylene or as in the preferred embodiment, a fiberboard material of the type disclosed in U.S. Pat. No. 5,007,532, issued Apr. 16, 1992, and entitled VISOR AND METHOD OF MAKING THE SAME, the disclosure of which is incorporated herein by reference. Core 30 integrally includes a front panel 32 and a rear panel 34 with the front panel including an aperture 31 for receiving an illuminated vanity mirror assembly 20 therein. The fold line for these integral panels is not shown in FIG. 3 for the sake of clearly showing the remaining elements of the vanity mirror assembly 20.

Figure 4:
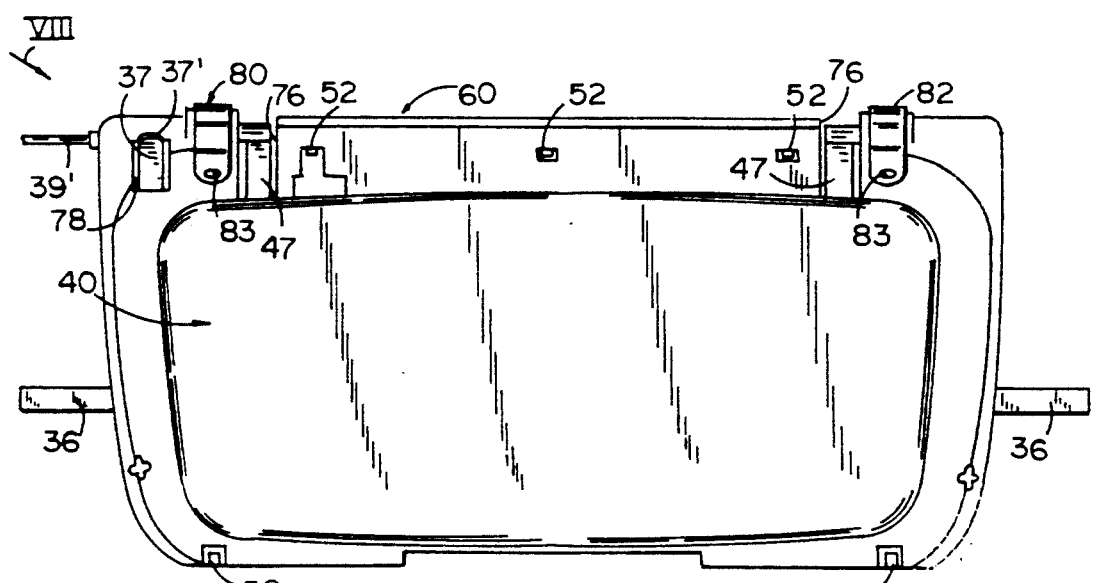
FIG. 4 is an enlarged, front-elevational view of the vanity mirror assembly shown in FIGS. 1-3.

Assembly 20 includes a cover 40 for a mirror 24 and mirror frame 60 with a pair of lenses 27 snap-in mounted into apertures 26 in the frame 60 located on opposite sides of the mirror 24. Illumination is provided by lamps 28 (FIG. 3) positioned behind lenses 27. The illuminated vanity mirror assembly 20 is assembled to the visor core within aperture 31 thereof by mounting tabs 52 (FIG. 4) spaced around the periphery of frame 60 as 7 also generally disclosed in U.S. Pat. No. 5,098,150 issued Mar. 24, 1992, and entitled VISOR COVER HINGE, the disclosure of which is incorporated herein by reference.

Figure 3:
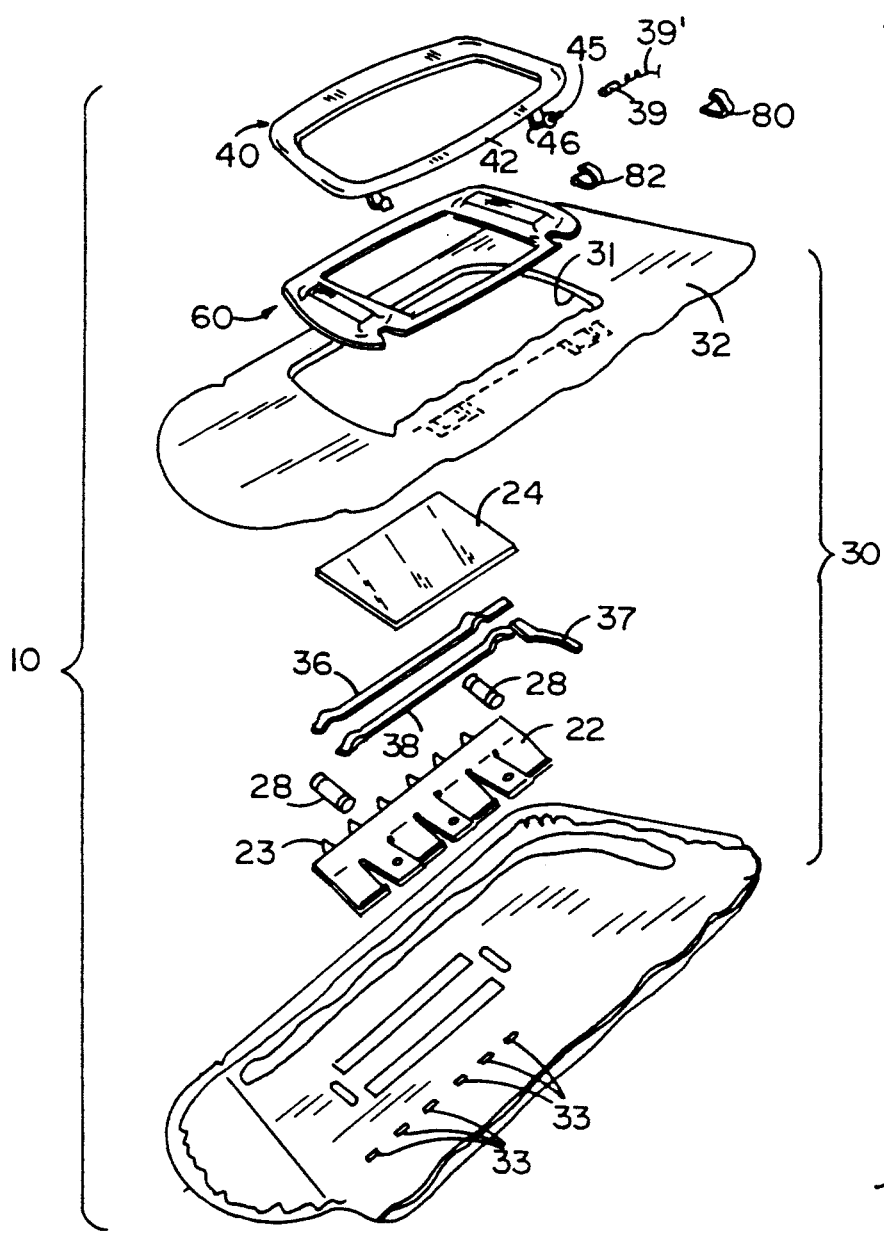
FIG. 3 is a perspective, exploded view of the visor embodying the present invention.

As seen in FIG. 3, the visor 10 includes a torque device 22 of the type disclosed in U.S. Pat. No. 5,004,289, which includes tabs 23 which lock within slots 33 of rear core panel 34 to lock the torque device to the visor core. A pivot rod associated with assembly 25 (FIGS. 1 and 2) extends within the torque device 22, as described in the above identified '289 patent, for allowing the snap-up and down operation of the visor between a raised stored position against the vehicle roof 26 and a lowered use position as shown in FIGS. 1 and 2 while the pivot mounting device 25 also allows the visor to be moved to the side window position.

Figure 5:
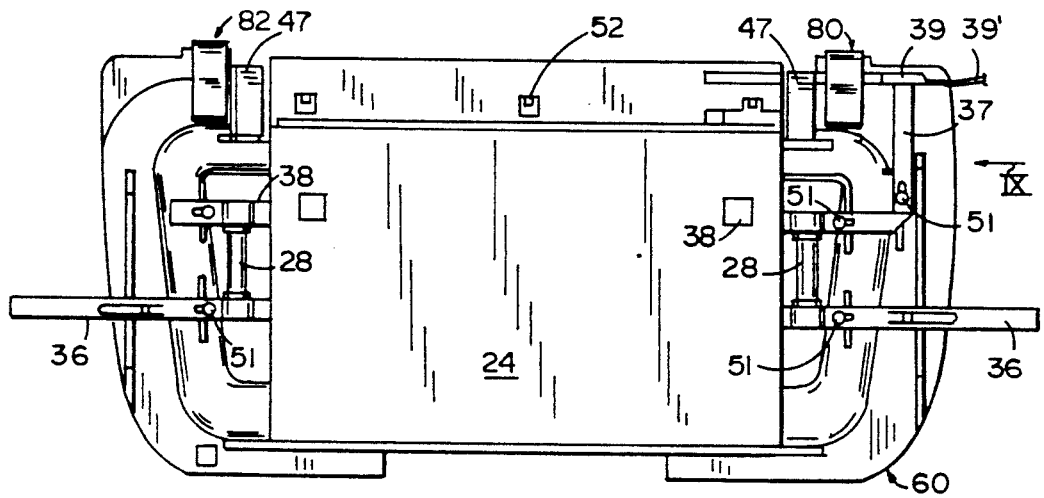
FIG. 5 is a rear, elevational view of the vanity mirror assembly shown in FIG. 4.
Figure 7:
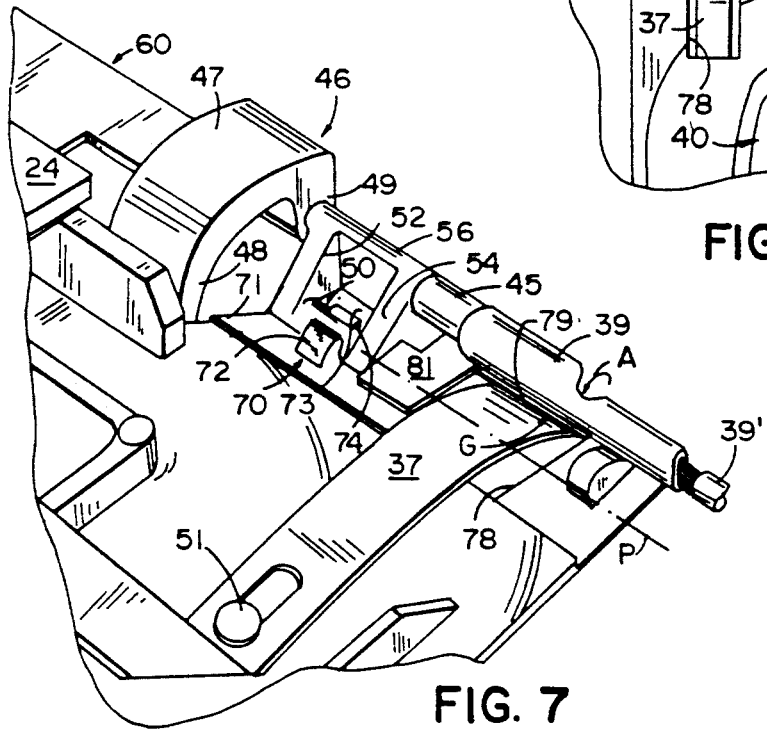
FIG. 7 is an enlarged, rear perspective view of the structure shown in FIG. 6.

A pair of circuit conductors 36 and 38 define at their opposite ends, as best seen in FIGS. 3 and 5, socket means for receiving cartridge-type lamps 28 with one end of conductor 38 extending orthogonally upwardly terminating in a switch contact 37. Contact 37 is mounted in a cantilevered fashion with a fixed end heat staked to frame 60 at 51 as seen in FIG. 7. The opposite end 37' of the deflected conductive strip which forms contact 37 extends through slot 78 (FIG. 8) in frame 60 and rests against a stop 79 which is the edge of the slot 78. As contact 39 rotates downwardly as seen by Arrow A in FIG. 7, it slides along and bends contact 37 away from stop 79 in a wiping action which assures a good electrical connection. Switch contact 39 is coupled to a supply conductor 39' for supplying operating power, through switch means defined by contacts 37 and 39 and their mounting structure, to lamps 28 when cover 40 is raised to an open position. Conductor 36 is coupled to the vehicle's ground by a second electrical conductor in a conventional manner.

The cover 40 includes an upper edge 42 to which there is mounted in spaced relationship a pair of mounting arm assemblies 44 and 46 which are substantially identical in construction with the exception that assembly 46 includes an outwardly projecting cylindrical tab 45 over which cylindrical barrel contact 39 extends for providing a switch as described in greater detail below.

The construction of arm assembly 46 is best seen in FIG. 7 in which spring clip 80 associated with arm 46 has been removed for the purpose of more clearly showing assembly 46. A similar spring clip 82 is employed in connection with arm 44 with clips 80 and 82 cooperating between cover 40 and mirror frame 60 to provide snapped-open and snapped-closed operation of the cover. The clips 80 and 82 are substantially identical and are also described below in greater detail in conjunction with FIGS. 11 and 12.

Figure 10:
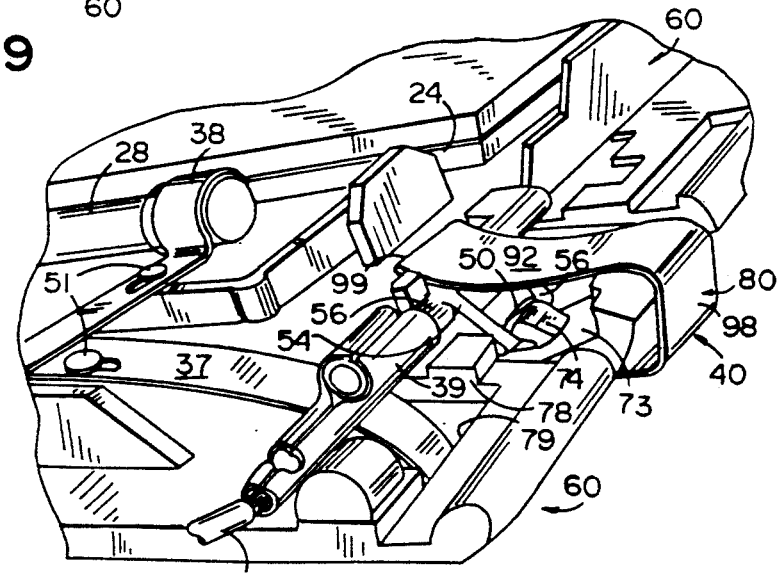
FIG. 10 is an enlarged, fragmentary, perspective view of the structure shown in FIG. 9 taken in a direction indicated by Arrow X in FIG. 9 but with the cover in an open, use position.

Turning now to FIG. 7, arm assembly 46 includes an arcuate arm 47 having a first end 48 integrally molded to the upper edge 42 of cover 40 on the inside of the cover facing frame 60. On the opposite end 49 of arcuate arm 47, and extending laterally outwardly therefrom, is an outwardly extending oblong-shaped cam 56 which engages spring clip 80 as described below. Extending from a side of cam 56 opposite clip 80 is an axle 50 supported in offset relationship to cam 56 by a pair of arms 52 and 54. In FIG. 7, the cover is shown in a closed position with spring 80 removed to show the pivot axle 50 held within the socket 70 of frame 60. Socket 70 includes a first upwardly extending tab 72 and a second upwardly extending tab 74, both of which include semi-cylindrical interior facing surfaces in spaced relationship with a slot for receiving pivot axle 50 in snap-fitting engagement therebetween. Thus, the spacing between the open ends of tabs 72 and 74 are such that the pivot axle 50 must be force-fitted within the resilient polymeric socket and once in its inserted position, as seen in FIG. 7, it is held in such position partly by the resilient curved tabs and partly by the compressive spring clip 80 which fits over the cover and frame. Cover 40 rotates about a pivot axis P (FIG. 7) which is aligned with pivot axle 50 of arm assembly 46 and a second axle of substantially identical pivot arm assembly 44 on the other side of the top of cover 40 in offset relationship to cam 56. Thus, when cover 40 is opened to a position shown, as seen in FIG. 10, the camming surface 56 is on a side of socket 70 and pivot axle 50 opposite that shown in FIG. 7. Compressive spring 80 grips the frame 60 on a side opposite cam member 56, and this force on cam member 56 helps to hold the cover pivot axle 50 within socket 70 and to provide a bias force in an over-center spring arrangement to assure that the cover moves toward and remains in a snapped-open or snapped-closed position. The structure and operation of the spring is described in greater detail below, subsequent to the following description of socket 70.

Figure 6:
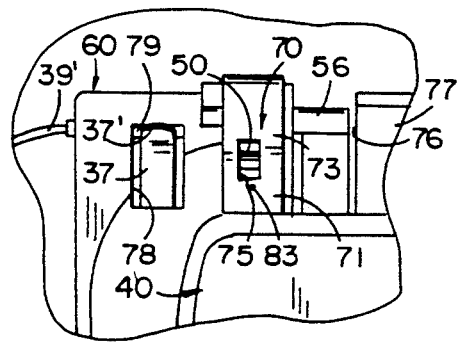
FIG. 6 is a greatly enlarged, fragmentary, front-elevational view of the upper left corner of the structure shown in FIG. 4 shown with the spring clip removed.
Figure 8:
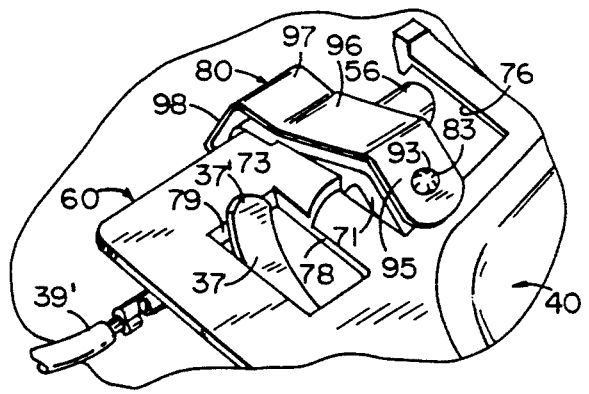
FIG. 8 is an enlarged, fragmentary front perspective view of the upper left corner shown in FIG. 4 taken in the direction of Arrow VIII of FIG. 4.

As best seen in FIGS. 6 and 7, frame 60 includes inclined walls 71 and 73 which intersect at an apex at which the tabs 72 and 74 are mounted. The tabs are formed by a die extending through a rectangular aperture 75 at the intersection of walls 71 and 73, as best seen in FIG. 6. Clearance for the curved arm 47 (and its corresponding arm in assembly 44) is provided by a notch 76 formed in the upper wall 77 of cover 60 as seen in FIGS. 4-7. A slot 78 on a side of notch 76 opposite walls 71 and 73 provides an aperture through which the tip or free end 37' of contact 37 extends and is supported on an edge thereof as best seen in FIGS. 6-8. As described above, the edge 79 of slot 78 defines a stop which holds the biased spring electrical contact 37 in a fixed position with respect to contact 39 attached to the extension 45 of cylindrical cam 56 of arm assembly 46. With the cover in a closed position, as seen in FIG. 7, a small gap indicated by Arrow G in FIG. 7 exists between electrical conductor 37 and switch contact 39, thereby preventing electrical contact with the switch. As the cover is opened and cam member 56 pivots about pivot axle 50 along axis P, the electrical switch contact 39 rotates downwardly generally indicated by Arrow A in FIGS. 7 and 10 to engage and deflect contact 37 as seen in FIG. 10 with the cover in an open position. It is noted here that the flat metallic conductors 36 and 38 including switch contact 37 are mounted to the polymeric frame 60 by a plurality of heat stake posts 51 as best seen in FIGS. 5 and 7 with the conductors 36 and 38 extending behind mirror 24 and captively held within a backing material for mirror 24.

The socket 70 for snap receiving and captively holding the cover axles in connection the spring clips 80 and 82, is formed as noted above by molding the frame 60 to include, as seen in FIG. 6, convexly projecting walls 71 and 73 which are concavely projecting from the opposite view shown in FIG. 7. This recesses the socket 70 such that the support arms 52 and 56 can offset the pivot axle from the upper edge 42 of the cover and maintain a relatively flat package for the mirror assembly 20. Also, the generally triangular side configuration of the inclined walls 71 and 73 and the inner surface 81 (FIG. 7) of the frame 60 provides support for holding the clips 80 and 82 in position. Also, for purposes of holding the spring clips in place, wall 71 includes an outwardly projecting tab 83 which extends within an aperture 93 (FIG. 11) of each of the spring clips 80 and 82 locking them in position as also seen in FIG. 8.

Figures 11, 12:
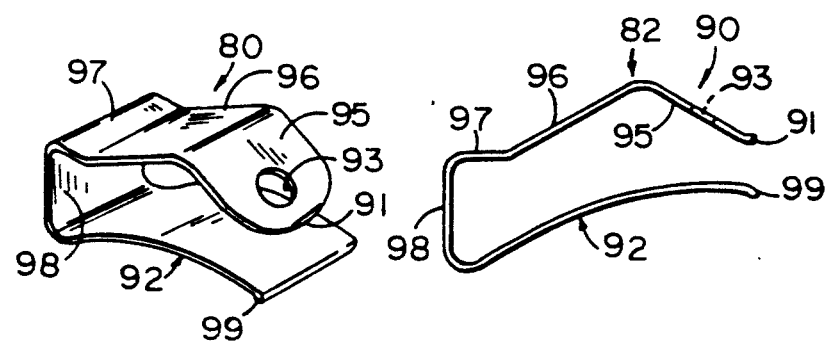
FIG. 11 is an enlarged perspective view of the spring clip embodying the present invention.
FIG. 12 is a side-elevational view of the spring clip shown in FIG. 11.

Each of the spring clips 80 and 82 are substantially identical with spring clip 82 being shown in detail in FIGS. 11 and 12. As seen in these Figs., the spring clips include an upper leg 90 and a lower leg 92 formed in a generally C-shaped configuration as seen in FIG. 12. Upper leg 90 includes an upwardly projecting tip end 91 extending outwardly and upwardly from a downwardly extending section 95 in which aperture 93 is formed. Section 95 is integral with a second section 96 of upper leg 90 which extends downwardly to form a shallow inverted V-shaped upper leg 90. Section 96 terminates in a generally horizontal extending section 97 which joins with a vertical end wall 98 coupling legs 90 and 92.

Leg 92 is convexly curved (as viewed from the cam side) with a downwardly depending tip 99 which in conjunction with curved tip 91 of leg 90 allows for the easy insertion of the spring clips 80 and 82 over the cover and frame combination, particularly over the socket 70 including walls 71 and 73 and around the cam 56. Clips 80 and 82 are made of a suitable spring steel material and are dimensioned to compressibly grip the cam 56 and hold pivot axle 50 within socket 70 thereby assisting in holding the cover to the frame while, at the same time, providing an over-spring biasing action for the cam 56 as noted above. Thus, the gap between legs 90 and 92 is slightly less than the spacing between the cam 56 and surfaces 71 and 73 of the socket such that the spring compressibly clamps the cover and frame together once installed as seen in FIGS. 4, 5 and 8-10.

Figure 9:
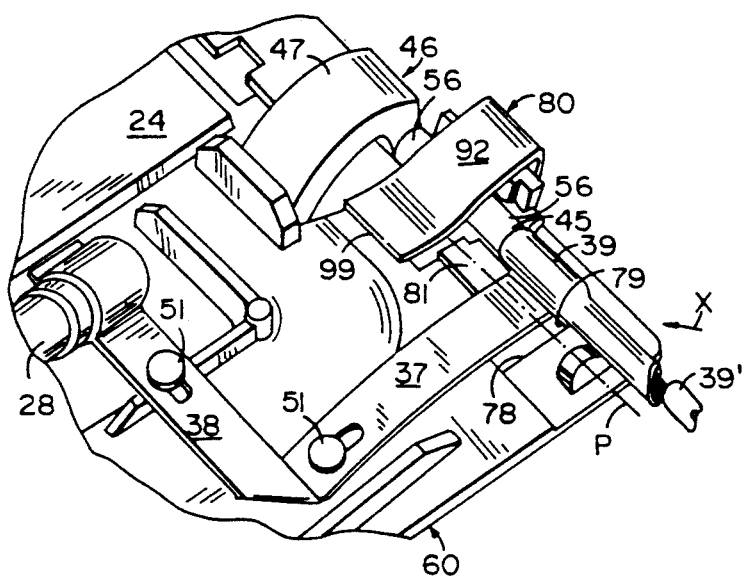
FIG. 9 is an enlarged, fragmentary, perspective view of the upper right corner of the structure shown in FIG. 5 taken generally in the direction of Arrow IX of FIG. 5.

The spring clips are held in position by the tabs 83 extending through apertures 93 but also by the engagement of leg section 95 against wall 71 and leg section 96 against wall section 73 with the angle between sections 95 and 96 being substantially the same as the angle of intersection between walls 71 and 73 of socket 70 on frame 60. Leg 92 of the spring clips, as best seen in FIGS. 9 and 10, engages the cam 56 along its length with the cam 56 being in a position closer to end wall 98 when the cover is closed, as seen in FIG. 9, and closer to the distal end 99 of leg 92 when the cover is in an open position as shown in FIG. 10. The curved surface of lower leg 92 provides a smooth contact area for the cam and maximum bias force in the center area of movement of the cam for urging the cover between open and closed positions with the spring being substantially undeflected when the cover is either open or closed but deflecting outwardly as the cover moves from one position to the other to provide the additional bias force necessary for urging the cover between the two positions. The spring clips provide a continuous compressive force to the cam 56 in either of the open or closed positions for securely holding the spring in place on the frame and cover and holding the cover in a rattle-free configuration in either the open or closed positions.

With the system of the present invention, a unique cover-to-frame mounting system provides an over-center spring action for controlling cover movement from either snapped-open or snapped-closed positions. The system utilizes a minimum number of parts and assembly is easily facilitated by snapping a cover into place within the frame and sliding the pair of bias springs over the spaced pivot axles for the cover. This construction provides a relatively inexpensive and yet functional and durable system for mounting a cover to a vehicle accessory such as a vanity mirror visor. It will become apparent to those skilled in the art that various modifications to the preferred embodiment as described herein can be made without departing from the spirit or scope thereof as defined by the appended claims.

The embodiments of the invention in which an exclusive property or privilege is claimed are defined as follows:

1. A cover assembly for a vehicle accessory comprising:
   a vehicle accessory including a support body, said support body including at least one of a pivot axle having an axis of rotation and an axle receiving socket;
   a cover for said accessory, said cover including at least one of the other of a pivot axle and an axle receiving socket;
   cam means mounted to one of said axle and socket and offset from the axis of rotation of said pivot axle when said pivot axle is extended into said socket; and
   spring clip means comprising a generally C-shaped member extending over said cam and socket for compressively engaging said cover and support body and including leg means engaging said cam for selectively urging said cover toward an open and a closed position as said cover is manually moved in a direction toward an open and a closed position, respectively.

2. The cover assembly as defined in claim 1 wherein said socket comprises a pair of facing, spaced, curved, resilient tabs extending from said support body.

3. The cover assembly as defined in claim 2 wherein said socket further includes a pair of inclined intersecting floor segments with said tabs formed at opposite sides of the intersection of said segments.

4. The cover assembly as defined in claim 3 wherein said C-shaped member includes a first leg having inclined sections which mate with said inclined floor segments of said socket on a side of said support body opposite said pivot axle.

5. The cover assembly as defined in claim 4 wherein said C-shaped member includes a second leg which is convexly curved toward said first leg to engage said cam means with an increasing force as said cover is moved between open and closed positions.

6. The cover assembly as defined in claim 1 wherein said cam means includes a switch contact which moves with said cover and said support body includes a switch contact which is engaged by said first named switch contact when said cover is moved to an open position.

7. The cover assembly as defined in claim 1 wherein said cover comprises a planar panel and includes a pair of spaced, curved arms extending from an edge thereof with each arm including a cam at an end thereof remote from said panel.

8. The cover assembly as defined in claim 7 wherein each of said curved arms further include spaced pivot arm support means for supporting said pivot axle therebetween in offset relationship to said cam means.

9. The cover assembly as defined in claim 8 wherein said cam means comprises an oval cam extending from a side of said end of said curved arm.

10. A cover assembly for a vehicle accessory comprising:
  a vehicle accessory including a support body including at least one pivot axle receiving socket;
  a cover including a pivot axle and a cam offset from said pivot axle, said pivot axle extending into said socket of said support body; and
  spring clip means comprising a generally C-shaped member extending over said pivot axle and socket for compressively engaging said cover and support body and including a leg engaging said cam for selectively urging said cover toward an open and a closed position as said cover is manually moved in a direction toward an open and a closed position respectively.

11. The cover assembly as defined in claim 10 wherein said socket comprises a pair of spaced, curved tabs extending from said support body.

12. The cover assembly as defined in claim 11 wherein said socket further includes a pair of inclined floor segments with said tabs formed at opposite sides of the intersection of said segments.

13. The cover assembly as defined in claim 12 wherein said C-shaped member includes a first leg having inclined sections which mate with said inclined floor segments of said socket on a side of said support body opposite said socket.

14. The cover assembly as defined in claim 13 wherein said cam includes a switch contact which moves with said cover and said support body includes a switch contact which is engaged by said first named switch contact when said cover is moved to an open position.

15. The cover assembly as defined in claim 10 wherein said cover comprises a planar panel and includes a pair of spaced, curved arms extending from an edge thereof with each arm including a cam at an end thereof remote from said panel.

16. The cover assembly as defined in claim 15 wherein each of said curved arms further includes spaced pivot arm means for supporting a pivot axle therebetween in offset relationship to said cam means.

17. An illuminated vanity mirror visor for an automobile comprising:
  a visor body including means for mounting the visor body to a vehicle for movement between selected use and storage positions;
  an illuminated vanity mirror assembly mounted to said visor body and including a mirror and means for illuminating said mirror therein, said assembly further including a cover and means for pivotally mounting said cover to said assembly, wherein the improvement comprises switch means including a first contact mounted directly to said pivot mounting means and movable with said cover between first and second positions, said switch means further including a second contact mounted to said assembly in a position to be selectively engaged by said first contact when said cover is in an open position, wherein said second switch contact is a deflectable contact comprising a strip of conductive material aligned with the direction of movement of said first contact to provide a wiping action for said switch means as said switch means is actuated upon movement of the cover, wherein said second switch contact is mounted in a cantilevered fashion to said assembly with one end free to deflect upon movement of said cover, and wherein said second switch contact is mounted to said assembly in a deflected position with said one end of said second switch contact engaging a stop such that as said first contact engages said second contact, said one end of said second contact lifts off said stop; and
  means for supplying electrical operating power to said switch means which is coupled between said supplying means and said means for illuminating said mirror when said cover is opened.

18. An illuminated vanity mirror visor for an automobile comprising:
  a visor body including means for mounting the visor body to a vehicle for movement between selected use and storage positions;
  an illuminated vanity mirror assembly mounted to said visor body and including a mirror and means for illuminating said mirror therein, said assembly further including a cover and means for pivotally mounting said cover to said assembly, wherein the improvement comprises switch means including a first contact mounted directly to said pivot mounting means and movable with said cover between first and second positions, said switch means further including a second contact mounted to said assembly in a position to be selectively engaged by said first contact when said cover is in an open position;
  means for supplying electrical operating power to said switch means which is coupled between said supplying means and said means for illuminating said mirror when said cover is opened; and wherein said means for pivotally mounting said cover includes a pivot axle and a cam offset from said pivot axle, said pivot axle extending into a socket formed in said visor body, and spring clip means comprising a generally C-shaped member extending over said pivot axle and socket for compressively engaging said cover and visor body and including a leg engaging said cam for selectively urging said cover toward an open and a closed position as said cover is manually moved in a direction toward an open and a closed position, respectively.

19. The visor as defined in claim 18 wherein said socket comprises a pair of spaced, curved tabs extending from said visor body.

20. The visor as defined in claim 19 wherein said socket further includes a pair of inclined floor segments with said tabs formed at opposite sides of the intersection of said segments.

21. The visor as defined in claim 20 wherein said C-shaped member includes a first leg having inclined sections which mate with said inclined floor segments of said socket on a side of said visor body opposite said socket.

22. The visor as defined in claim 21 wherein said cover comprises a planar panel and includes a pair of spaced, curved arms extending from an edge thereof with each arm including a cam at an end thereof remote from said panel.

23. The visor as defined in claim 22 wherein each of said curved arms further includes spaced pivot arm means for supporting a pivot axle therebetween in offset relationship to said cam means.

24. The visor as defined in claim 23 wherein said visor body comprises a visor core and a mirror frame mounted to said core, and wherein said socket is formed on said mirror frame.

25. A visor including a covered mirror assembly for a vehicle accessory comprising:
   a visor support member including at least one pivot axle receiving socket;
   a cover including a pivot axle and a cam offset from said pivot axle, said pivot axle extending into said socket of said support member; and
   spring clip means comprising a generally C-shaped member extending over said pivot axle and socket for compressively engaging said cover and support member and including a leg engaging said cam for selectively urging said cover toward an open and a closed position as said cover is manually moved in a direction toward an open and a closed position, respectively.

26. The visor as defined in claim 25 wherein said visor support member comprises a visor core and a mirror frame mounted to said core, and wherein said socket is formed on said mirror frame.

27. The visor as defined in claim 26 wherein said socket comprises a pair of spaced, curved tabs extending from said frame.

28. The visor as defined in claim 27 wherein said socket further includes a pair of inclined floor segments with said tabs formed at opposite sides of the intersection of said segments.

29. The visor as defined in claim 28 wherein said C-shaped member includes a first leg having inclined sections which mate with said inclined floor segments of said socket on a side of said frame opposite said socket.

30. The visor as defined in claim 29 wherein said cam includes a switch contact which moves with said cover, and said frame includes a switch contact which is engaged by said first-named switch contact when said cover is moved to an open position.

31. The visor as defined in claim 25 wherein said cover comprises a planar panel and includes a pair of spaced, curved arms extending from an edge thereof with each arm including one of said cams at an end thereof remote from said panel.

32. The visor as defined in claim 31 wherein each of said curved arms further includes spaced pivot arm means for supporting a pivot axle therebetween in offset relationship to said cam.

33. The visor as defined in claim 32 wherein said cover is formed to integrally include said pivot arm means, said cams, and said pivot axles.

* * * * *